(12) United States Patent
Sridhar et al.

(10) Patent No.: US 11,128,536 B2
(45) Date of Patent: Sep. 21, 2021

(54) SYSTEM AND METHOD FOR INTENT BASED TRAFFIC MANAGEMENT

(71) Applicant: Sandvine Corporation, Waterloo (CA)

(72) Inventors: Kamakshi Sridhar, Fremont, CA (US); Lars Anton Gunnarsson, Bangkok (TH); Mostafa Mohamed Hassan, Waterloo (CA); Alexander Havang, Malmo (SE); Matthew Lee Farmer, London (GB); Roberto Lucarelli, Rome (IT); Mark Daniel Yamada, Waterloo (CA); Peter Thomas Salanki, Fremont, CA (US); Kenneth David Faiczak, Waterloo (CA)

( * ) Notice: Subject to any disclaimer, the term of this patent is extended or adjusted under 35 U.S.C. 154(b) by 35 days.

(21) Appl. No.: 16/579,272

(22) Filed: Sep. 23, 2019

(65) Prior Publication Data
US 2020/0112483 A1 Apr. 9, 2020

Related U.S. Application Data

(60) Provisional application No. 62/741,123, filed on Oct. 4, 2018.

(51) Int. Cl.
*H04L 12/24* (2006.01)
*H04L 12/815* (2013.01)
*H04L 12/851* (2013.01)
*H04L 29/12* (2006.01)

(52) U.S. Cl.
CPC ...... *H04L 41/0896* (2013.01); *H04L 41/5067* (2013.01); *H04L 47/22* (2013.01); *H04L 47/2441* (2013.01); *H04L 61/1511* (2013.01)

(58) Field of Classification Search
None
See application file for complete search history.

(56) References Cited

U.S. PATENT DOCUMENTS

| | | | | |
|---|---|---|---|---|
| 7,738,375 B1* | 6/2010 | Vinokour | ................ | H04L 47/20 370/232 |
| 2003/0069973 A1* | 4/2003 | Ganesan | ............. | H04L 63/0485 709/226 |
| 2003/0126233 A1* | 7/2003 | Bryers | .................... | H04L 29/06 709/219 |
| 2004/0013119 A1* | 1/2004 | MeLampy | .............. | H04L 29/06 370/395.21 |
| 2008/0155087 A1 | 6/2008 | Blouin et al. | | |

(Continued)

OTHER PUBLICATIONS

European Patent Office, Extended European Search Report for 19200111.3-1215, ED/YA/P6644EPOO, dated Jan. 20, 2020.

(Continued)

*Primary Examiner* — Brian Whipple
(74) *Attorney, Agent, or Firm* — Gowling WLG (Canada) LLP; Neil W. Henderson

(57) ABSTRACT

A system and a method for traffic management on a network. The method including: determining a desired outcome for a network operator's traffic; determining a set of classes for a traffic flow through a link; determining a minimum and target bandwidth for each class in the set of class based on the desired outcome; measure user score and bandwidth use for each class; allocate a bandwidth per class based on the minimum and target bandwidth and measured user score; and shape the traffic flow to the allocated bandwidth.

18 Claims, 16 Drawing Sheets

(56) References Cited

U.S. PATENT DOCUMENTS

2010/0188975 A1    7/2010   Raleigh
2014/0334309 A1   11/2014   Mihaly et al.
2017/0325120 A1   11/2017   Szilagyi et al.

OTHER PUBLICATIONS

Ben Ameur Chiheb et al: "Performance evaluation of TcpHas:TCP for HTTP adaptive streaming", Multimedia Systems, ACM, New York, NY, US, vol. 24, No. 5, Mar. 31, 2018 (Mar. 31, 2018), pp. 491-508, XP036602264, ISSN: 0942-4962, DOI: 10.1007/S00530-018-0587-8.
European Patent Office, Examiner's Report for 19200111.3-1215, ED/YA/P6644EPOO, dated Apr. 19, 2021.
Quiros Juan et al: "Application of virtualization technology to the study of quality of service techniques", 2014 XI Tecnologias Aplicadas a la Ensenanza de la Electronica (Technologies Applied To Electronics Teaching) (TAEE), IEEE, Jun. 11, 2014 (Jun. 11, 2014), pp. 1-6, XP032644880, DOI: 10.1109/TAEE.2014.6900179.

\* cited by examiner

|        | Score | Bps in | Bps out | RTT ms | Loss % |
|--------|-------|--------|---------|--------|--------|
| gaming | 0     | 0      | 0       | 500    | 5      |
| gaming | 1     | 64000  | 0       | 200    | 4      |
| gaming | 2     | 128000 | 32000   | 150    | 3      |
| gaming | 3     | 196000 | 64000   | 750    | 2      |
| gaming | 4     | 256000 | 128000  | 500    | 1      |
| gaming | 5     | 512000 | 256000  | 250    | 0.5    |
| social | 6     | 640000 | 512000  | 100    | 0.2    |
| social | 0     | 0      | 0       | 600    | 10     |
| social | 1     | 32000  | 16000   | 400    | 6      |
| social | 2     | 64000  | 32000   | 300    | 5      |
| social | 3     | 128000 | 64000   | 200    | 4      |
| social | 4     | 256000 | 128000  | 100    | 2      |
| social | 5     | 400000 | 256000  | 50     | 1      |

FIG. 11

SYSTEM AND METHOD FOR INTENT BASED TRAFFIC MANAGEMENT

RELATED APPLICATIONS

The present disclosure claims priority to the U.S. Provisional Application No. 62/741,123 filed Oct. 4, 2018, which is hereby incorporated by reference.

FIELD

The present disclosure relates generally to computer network traffic. More particularly, the present disclosure relates to a system and method for intent based traffic management and traffic shaping.

BACKGROUND

Network traffic continues to increase all over the world. Multiple applications are contending for link capacity and link congestion varies dynamically as users enter and leave the network. Various types of applications are contending for limited link capacity and traditionally each traffic type is allocated a certain percent of the overall network bandwidth. In addition to data plane traffic, there is a percent of bandwidth (typically fixed) allocated for network management or certain specific classes, for example, DNS signaling, which must go through.

Further, users tend to expect high quality of experience (QoE) for video, voice and data applications. For streaming video, users expect to see picture frames with no stalls, and a consistently smooth QoE even under challenging radio and mobility conditions. For data, users expect fast download times, and for voice users expect high voice quality with no call drops. As such, there are often issues determining which traffic to prioritize during times when links are congested.

It is, therefore, desirable to provide an improved method and system for traffic management.

The above information is presented as background information only to assist with an understanding of the present disclosure. No determination has been made, and no assertion is made, as to whether any of the above might be applicable as prior art with regard to the present disclosure.

SUMMARY

In a first aspect, there is provided a method for traffic management on a network, the method including: determining a desired outcome for a network operator's traffic; determining a set of classes for a traffic flow through a link; determining a minimum and target bandwidth for each class in the set of class based on the desired outcome; measure user score and bandwidth use for each class; allocate a bandwidth per class based on the minimum and target bandwidth and measured user score; and shape the traffic flow to the allocated bandwidth.

In some cases, the method may further include: determining whether the shaped traffic is improving the measured user score; if the shaped traffic is improving the measured user score, continue to take further action; otherwise reduce the shaping per class.

In some cases, the method may further include: estimating a link capacity; determine whether the shaped traffic is able to meet a target score; if the target score is unreachable, amend the estimated link capacity and amend the target and minimum scores.

In some cases, if the bandwidth to be allocated is less than the target bandwidth per class, the bandwidth over the minimum bandwidth per class may be allocated equally among classes. In some other cases, if the bandwidth to be allocated is less than the target bandwidth per class, the bandwidth over the minimum bandwidth per class may be allocated proportionally among classes.

In some cases, the set of classes may be based on application type.

In some cases, the measured user score may be based on at least one QoE metric.

In some cases, the measured user score may be based on a combination of Round trip time, Throughput and Loss.

In some cases, one class in the set of classes may be dedicated to DNS signaling, and a minimum bandwidth for this class ensures the DNS signaling reaches its destination.

In some cases, the measured user score may be determined on a predetermined interval.

In some cases, the predetermined interval may be five minutes.

In another aspect, there is provided a system for traffic management on a network, the system including: an allocation module configured to determine a desired outcome for a network operator's traffic, a set of classes for a traffic flow through a link; and a minimum and target bandwidth for each class in the set of class based on the desired outcome; an analysis module configured to measure user score and bandwidth use for each class and allocate a bandwidth per class based on the minimum and target bandwidth and measured user score; and at least one shaper configured to shape the traffic flow to the allocated bandwidth.

In some cases, if the analysis module determines the shaped traffic is improving the measured user score the at least one shaper may continue to take further action; otherwise the at least one shaper may reduce the shaping per class.

In some cases, the set of classes may be based on application type.

In some cases, the measured user score may be based on at least one QoE metric.

In some cases, the measured user score may be based on a combination of Round trip time, Throughput and Loss.

In some cases, one class in the set of classes may be dedicated to DNS signaling, and a minimum bandwidth for this class ensures the DNS signaling reaches its destination.

In some cases, the analysis module may determine the measured user score on a predetermined interval.

Other aspects and features of the present disclosure will become apparent to those ordinarily skilled in the art upon review of the following description of specific embodiments in conjunction with the accompanying figures.

BRIEF DESCRIPTION OF FIGURES

Embodiments of the present disclosure will now be described, by way of example only, with reference to the attached Figures.

FIG. 11 illustrates a table illustrating a breakdown of the gaming class in FIG. 6;

DESCRIPTION

Generally, the present disclosure provides a method and system for intent based traffic management.

Figure 1A:
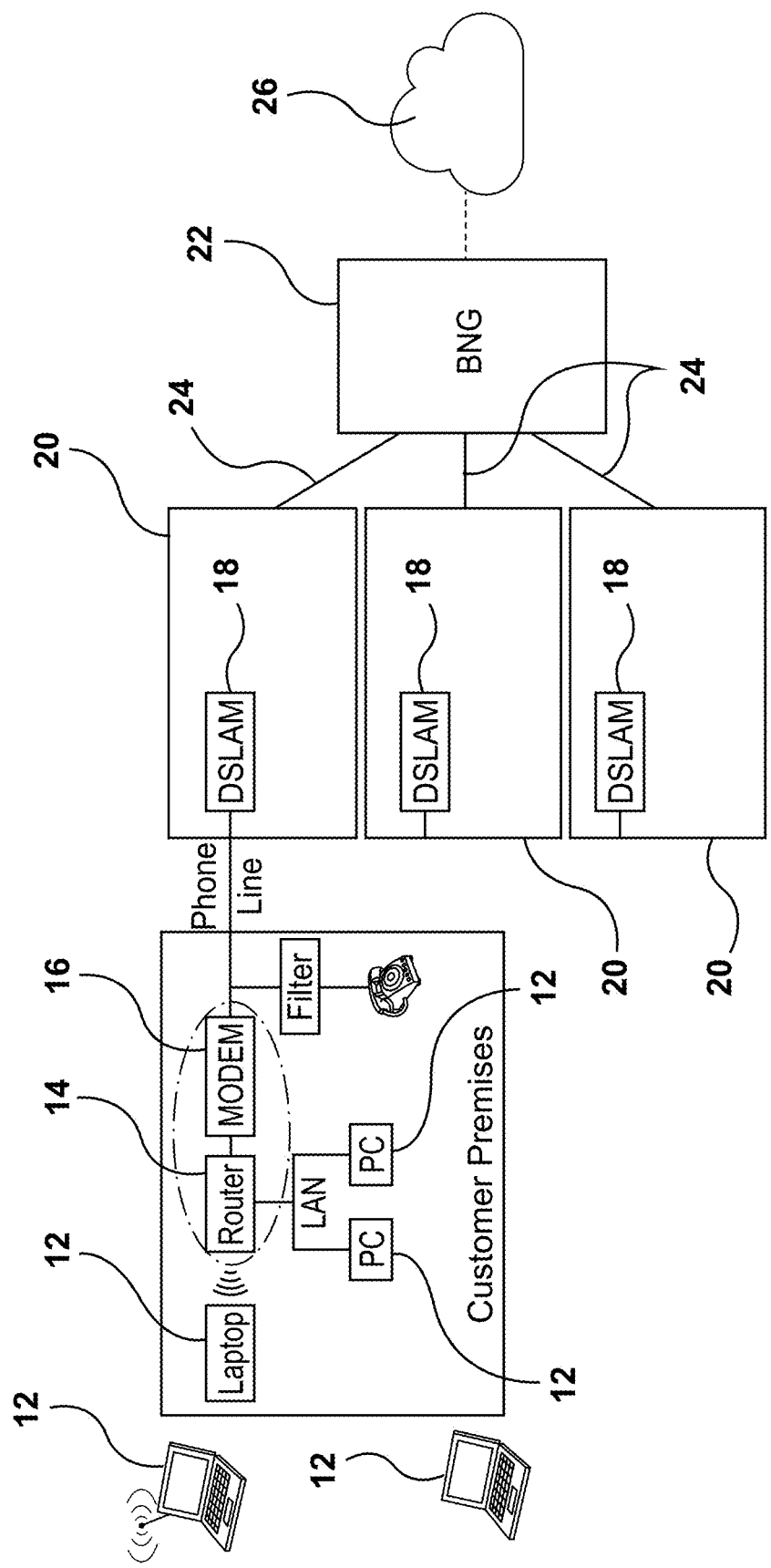
FIGS. 1A and 1B illustrate diagrams of computer networks.

FIG. 1A shows an architectural diagram of a computer network 10. Subscribers, via user equipment 12, such as laptops, mobile phones, personal computers, often connect to a router 14 and/or modem 16 to gain Internet connectivity. In some cases, the subscribers may access a Digital Subscriber Line Access Multiplexer (DSLAM) 18 in an access network 20, (three access networks are shown in FIG. 1A). The access network may connect via a link 24 to a broadband network gateway 22, which provides for online connectivity and connects to the Internet 26. In some cases, the link connection between the broadband network gateway 22 (and/or the core network) and the access network 20 may suffer from congestion, especially during peak times of the day.

The link 24 may be a GigaEthernet (GigE) connection to backhaul traffic from an operator to offer new services to its customers. Multiple applications may be contending for a limited fixed access link capacity, for example, 1 Gigabyte per second (Gbps). This GigE Service tends to be expensive. In an example customer network, there may be 4000-5000 subscribers for each GigE link. Links are generally congested for several hours during the days, for example, from 2 PM to 10 PM and there may be many of these links in a small network, for example, 100 to 200.

Figure 1B:
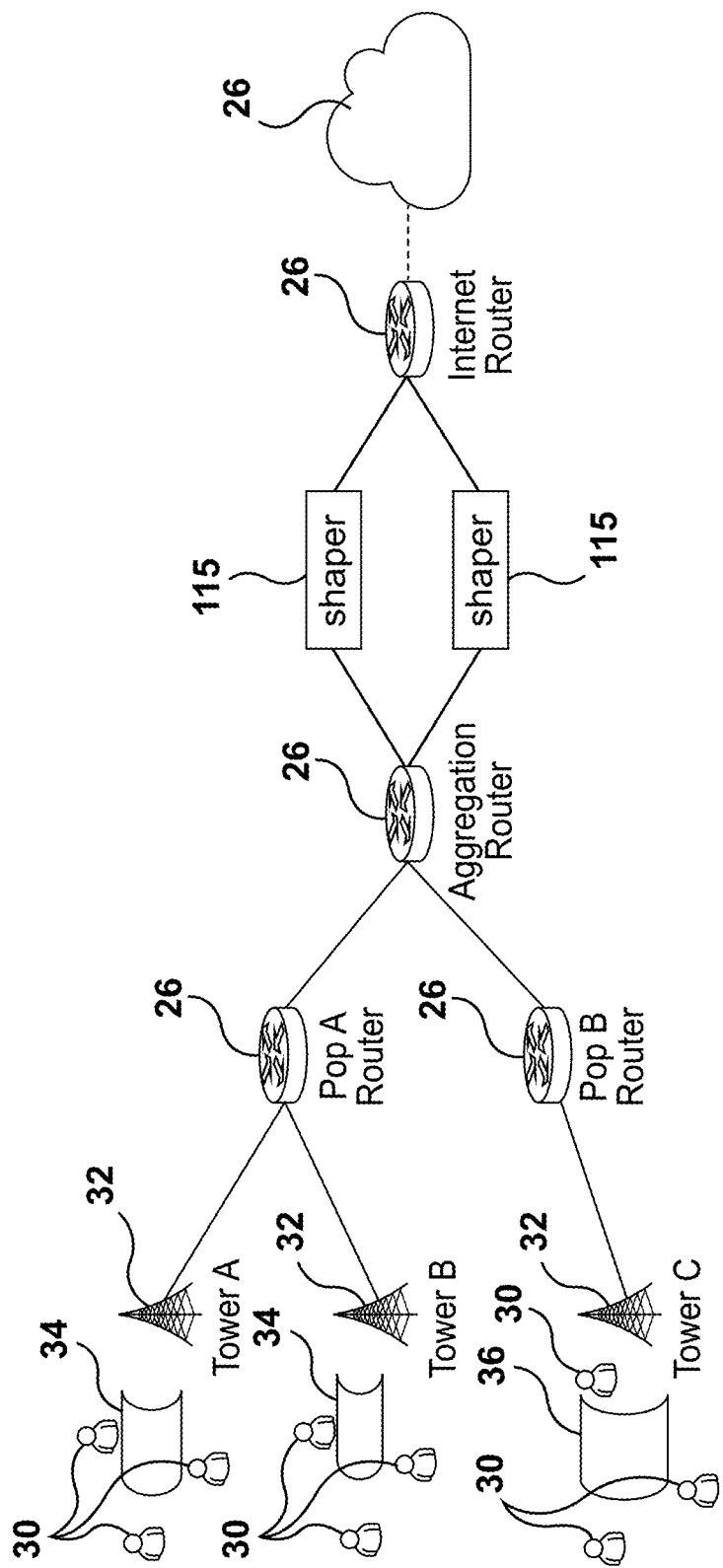

FIG. 1B illustrates another architectural diagram of a computer network. Subscribers 30 access the internet 26 via user equipment accessing a cell tower 32. In some cases, the cell tower 32 may be congested or subscribers may be overloading the some cell towers, as some cell towers may have smaller capacity 34. Other cell towers may have the capacity 36 for a greater number of subscribers, or greater amount of network traffic. The cell towers 32 may then direct the traffic to a router 38 prior to aggregating the traffic at an aggregation router 40 to be directed to an internet router 42. In some cases, the traffic may be directed via a shaper 115 such a shaper described in further detail herein.

Figure 2:
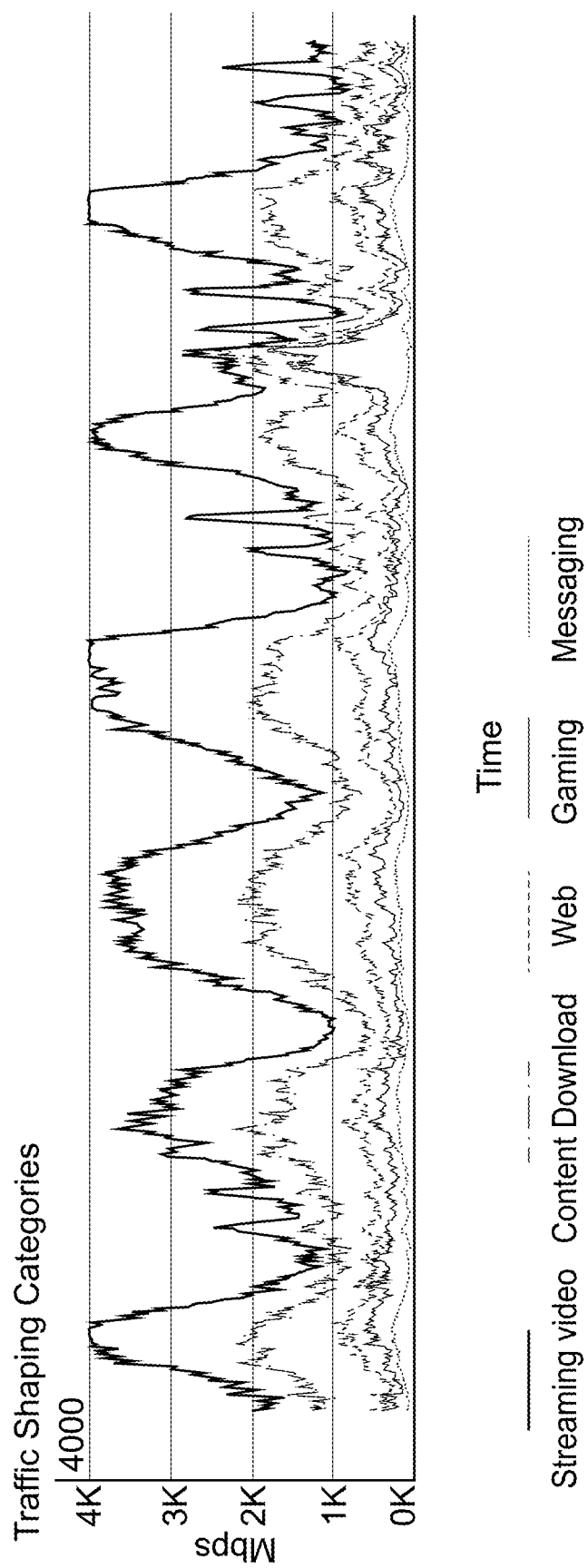
FIG. 2 illustrates a typical application type mix over time.

Different applications and traffic types are carried over each link. FIG. 2 illustrates an example application mix, which varies over time. This application mix may be carried on the link 24. Conventionally, each traffic type is allocated a certain percent of the overall available network bandwidth. In addition to the data plane traffic, there is some fixed percentage bandwidth allocated to the certain classes, for example, DNS signaling, which must go through the link.

In embodiments of the proposed system and method, each class has only one application type (for example, Video1) with multiple applications (for example, SKY, and HTTP interactive). There may be another application type (for example, Video2) with another set of applications (for example, Netflix™ streaming service, and Short YouTube™ streaming service). In one example, there may be another application type (Video 3) that support Long YouTube™ streaming service and the like. Further applications may also be divided into application type. Shapers shape traffic per class (which would imply shaping per application type). It is intended that the shaping is performed only on the application types (for each class).

Flows may be classified in various classes and may be configured as per operator specifications, depending on, for example, application type, customer type (for example, whether it is a business customer or residential customer) or other criteria. Different applications have different network parameter expectations. Video flows are high throughput flows but may be more tolerant to latency. Gaming flows may require low loss, low latency and high throughput. Web traffic may require high throughput. Voice flows may require low throughput but may be more sensitive to latency. It has further been noted that business customers may require higher quality of experience for their flows compared to residential customers since they often pay more for the service than residential customers. The proposed method and system are intended to classify application types based on the need of the application type and other flow criteria.

Each application type is intended to have a target QoE that is expected to be maintained for all subscribers who use this application. It is intended that by using the intent based traffic shaping or traffic management described herein, operators may dynamically optimize the link capacity for various application mixes to maximize application QoE. In network traffic, multiple applications are contending for link capacity. Link congestion varies dynamically as users enter and leave the network. By using intent based traffic management, the system and method are intending to provide for optimal application QoE per user, while ensuring fairness amongst all users, in all link congestion situations.

Embodiments of the traffic shaping method are intended to meet one or more of the following criteria:

Traffic for each application is to be shaped based on application specific QoE metrics;

Minimal manual configuration as traffic shaping should not need any threshold and/or WFQ settings;

Certain classes must always be allocated bandwidth, for example, DNS signaling must always go through; and Bandwidth allocation for one or more applications (for example, Netflix™, YouTube™ streaming service, or the like) must be configurable so that tests such as Netflix™ speed test can meet and exceed operator defined QoE metrics.

Fair Share Traffic Management (FSTM), a conventional solution, aimed to maximize application QoE by shaping each traffic class to a certain fixed percentage based on average Round Trip Time (aRTT) feedback. In a conventional operator network deployment, FSTM Dynamic Congestion Management supports 4 traffic class priorities, namely, High, Medium, LongMedia, and Low. The QoE metric used in these conventional solutions is aRTT, which is generally the only metric applied for all applications. The threshold settings (for each application type) for the shapers to set bandwidth allocation within the link are conventionally configured manually by the operator and the fine tuning of these threshold settings is done through trial and error by observing the impact on QoE, and in particular the aRTT. In the conventional solutions, a shaper manages the priority amongst application classes Weighted Fair Queuing (WFQ) is then used to change the weights within a given traffic class, for example, a medium priority (MP) class. A shaper will generally shape to a certain preconfigured percentage for each traffic class, for example: 13% for Low Priority, 25% Medium Priority and 10% LongMedia for an existing network operator deployment. In most conventional cases, the traffic shaper may shape regularly every 5 seconds (which tends to be the FSTM fuzzy system frequency).

In general, the conventional Fair Share Traffic Management (FSTM) method is as follows:
  i. Every step 5% of ALL Low Priorty traffic is shaped till 13% of Low Priority traffic remains. If aRTT is not good then:
  ii. Every step 5% of ALL LongMedia traffic is shaped till 10% of LongMedia traffic remains. If aRTT is not good then:
  iii. Every step 5% of ALL Medium Priority traffic is shaped till 25% of Medium Priority traffic remains.

Only if all this shaping is not enough then will the high priority traffic be shaped. When shaping MP traffic, more bandwidth may be give to applications on the same priority with WFQ.

It has been determined that there are limitations to this manner of traffic management. It has been noted that the traffic mix changes depending on the seasons and therefore the threshold settings need to be changed and fine-tuned manually frequently. It is difficult to estimate these settings without a lot of fine-tuning. Pre-configured static allocations for various traffic types do not tend to be optimal to ensure good QoE for end users.

As QoE is measured through average RTT, irrespective of the application, RTT may not be a good or accurate metric for QoE for many applications such as streaming video, gaming (UDP based), voice etc. For optimal user QoE, application specific QoE metric would be preferable to be used for shaping individual classes, as used in the present system and method described herein.

Figure 3:
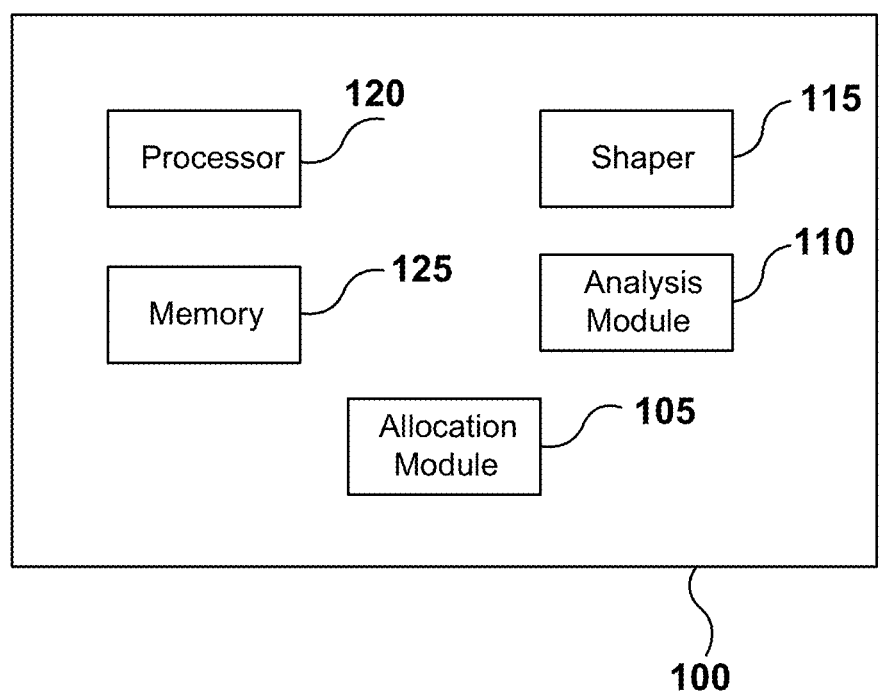
FIG. 3 illustrates a system for intent based traffic management.

FIG. 3 illustrates an embodiment of a system 100 for intent based traffic management. The system includes an allocation module 105, an analysis module 110, at least one shaper 115, at least one processor 120 and at least one memory 125 component. The system is intended to reside on the core network. The modules, including the processor 120 and memory 125, are in communication with each other but may be distributed over various network devices or may be housed within a single network device. The system is intended to receive information from the computer network equipment that allows the system to determine traffic flow information, including application type. The at least one shaper 115 of the system is then intended to shape traffic based on criteria, as described below.

The allocation module 105 is intended to associate an application type with a shaper. The allocation module 105 may initialize a minimum and target score as described herein and these initial scores may be saved within the memory component. The allocation module 105 is intended to preset or initialize the system. The allocation module is also intended to receive an operator intent or desired network outcome. In some cases, the operator intent or desired network outcome may be predetermined by the system. In other cases, an operator may manually configure an operator's intent, allowing for certain application types to receive greater QoE score than other application types as detailed herein.

The analysis module 110 is configured to measure user score and bandwidth per user. Once the measurements are determined, the analysis module 110 may compute a minimum and target capacity per class or per application. The analysis module 110 may determine the proposed shaping per class and assign the at least one shaper to shape the class.

Figure 4:
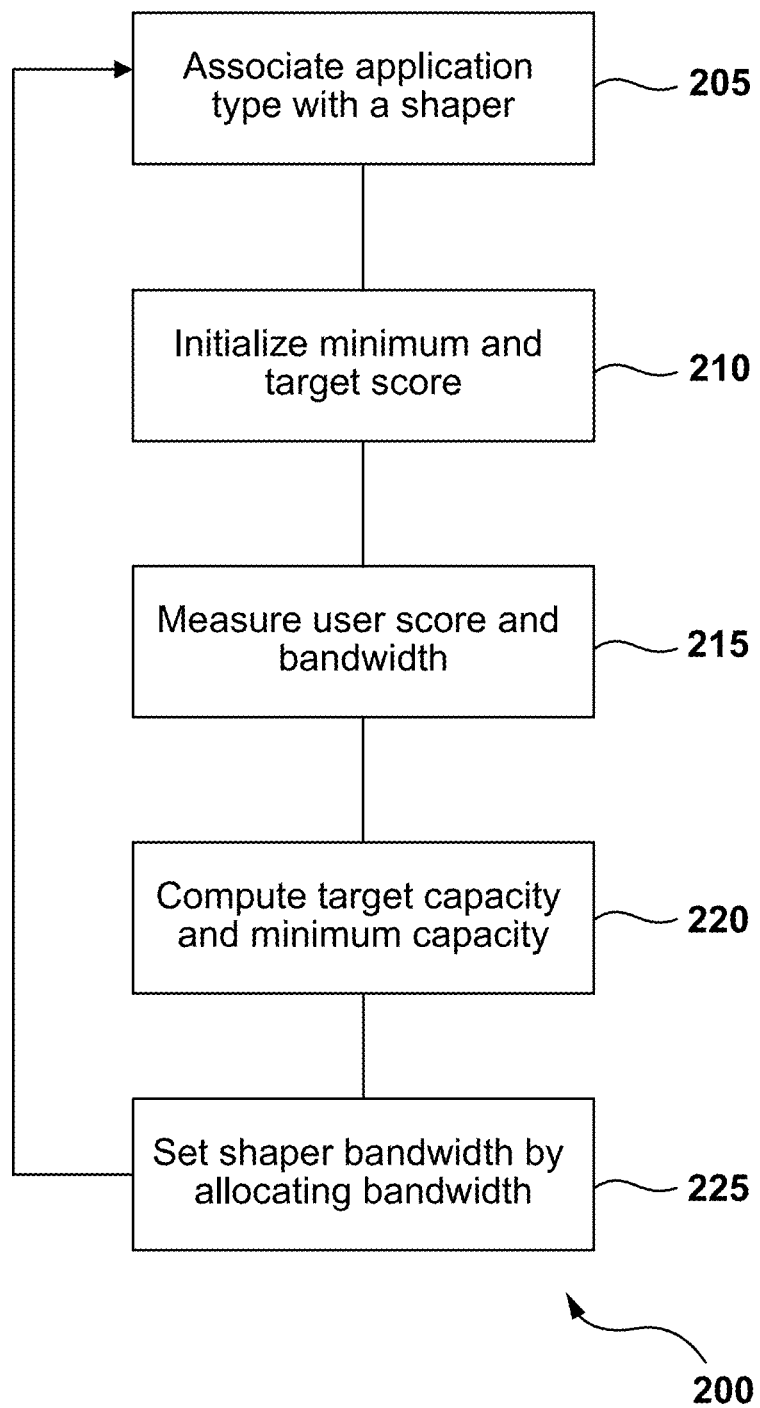
FIG. 4 is a flow chart illustrating a method for intent based traffic management.

The at least one shaper 115 will allocate the bandwidth per class as received from the analysis module 110 to shape the traffic of the network as detailed herein FIG. 4 illustrates an embodiment of a method 200 for intent based traffic management. The operator expresses an intent that is a reflection of a desired network outcome, for example, an aim to maximize user QoE, minimize cost, or the like. The goal is to steer the network towards the desired network outcome, via shaping or other network manipulation techniques. Although it would be preferred if the network operating point was immediately reached, due to changing network conditions, the actual network operation may deviate from the desired outcome. The embodiments of the system and method described herein are intended to review network conditions and bring the network operating point towards the operator's intent by shaping traffic with the various application classes.

The system configures the shapers by associating an application type with a shaper at 205. The allocation module initializes the shaper by determining and setting a minimum and target score per application type, at 210. The analysis module may then measure a user score and associated bandwidth, at 215. The system may compute a minimum and target capacity to determine an appropriate shaping to be applied to the traffic, at 220. The at least one shaper then allocates bandwidth per class, at 225.

Other criteria, besides minimum score and target score may include optional network criteria such as time of day, location or the like. The settings of the minimum score and the target score may be adjusted to account for specific events, or seasons. For example, based on expected surge in traffic for one particular service type during a major concert event, streaming video may be assigned higher minimum score and target score. Accordingly, the target score and the minimum score may be made configurable to reflect the network operator's desire to steer the network towards a desired outcome or a different operating point so that QoE during specific times are maximized for a given class of applications.

Figure 5:
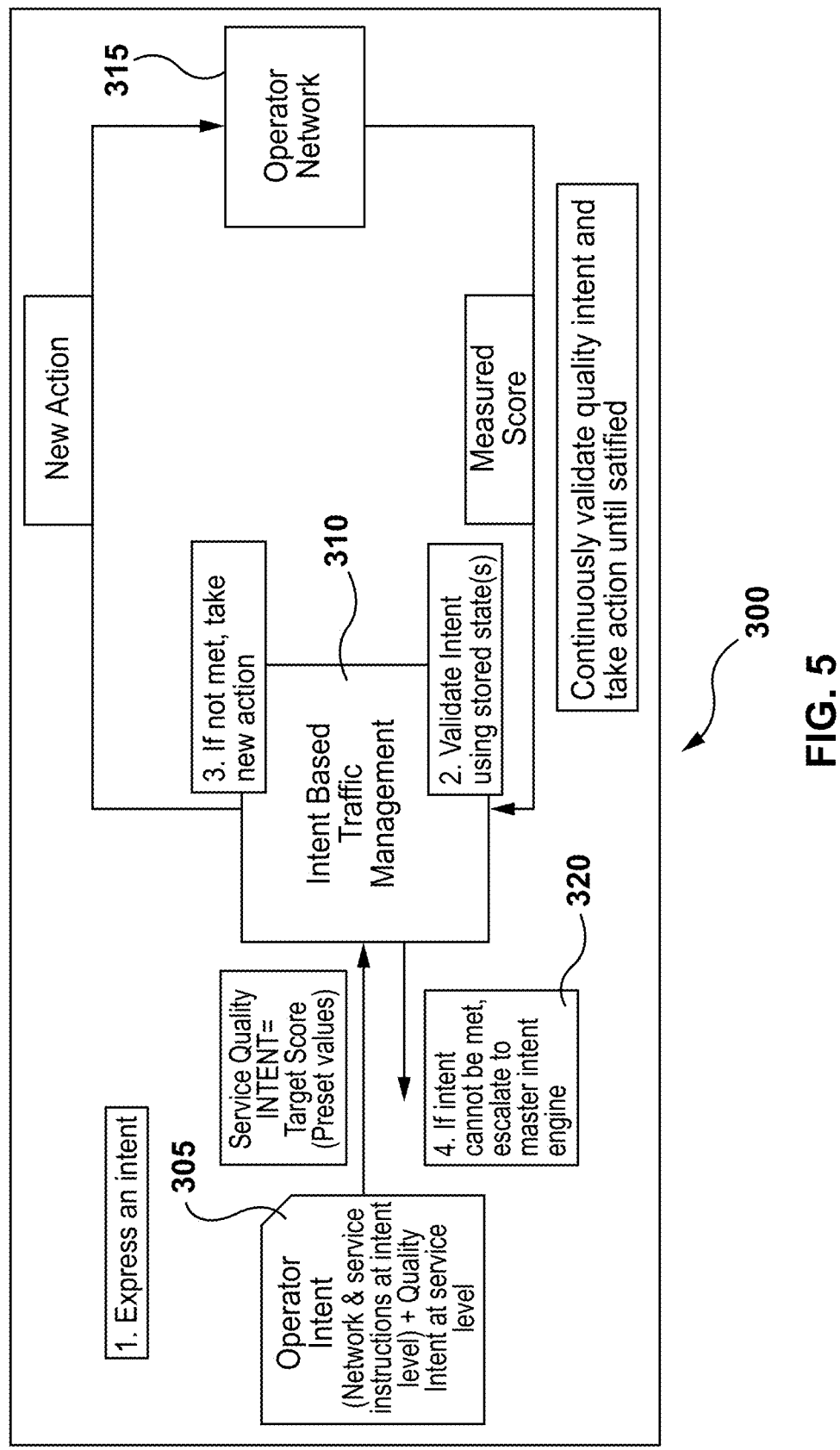
FIG. 5 illustrate a method of continuous validation according to an embodiment.

FIG. 5 illustrates a method 300 for continuous validation of the method 200 for intent based traffic management. The operator expresses or defines an intent at 305. The intent may be expressed as, for example, network and service instructions, which may include an intent level and a quality intent at various service levels. In some cases, the intent may be application specific, or may be network specific. The system 100 is now initialized based on the defined operator intent.

The method for intent based traffic provides for traffic management at, 310. The at least one shaper provides for action to be taken at the operators network in shaping the bandwidth based on the application type and the desired outcome to the operator. At 315, the analysis module 110 reviews the network traffic to determine a measured score to validate the intent and desired outcome of the network. The system 100 is intended to validate the intent using stored states previously stored in the memory component 125. If the intent or desired outcome is not met, the system 100 may continue to take new action via the at least one shaper 115, and validate the action based on the stored states. This is intended to allow for the system 100 to continuously validate the quality intent and to take actions until the service quality and network intent are achieved or determined to be not achievable.

In some cases, it may be determined, from reviewing the stored states of the network that the operator desired intent is not able to be met. In this cases, at 320, the system may determine to escalate the matter, either by notifying the operator that the desired outcome is unreachable, by modifying parameters to obtain an outcome closer to the desired outcome or the like.

Figure 6:
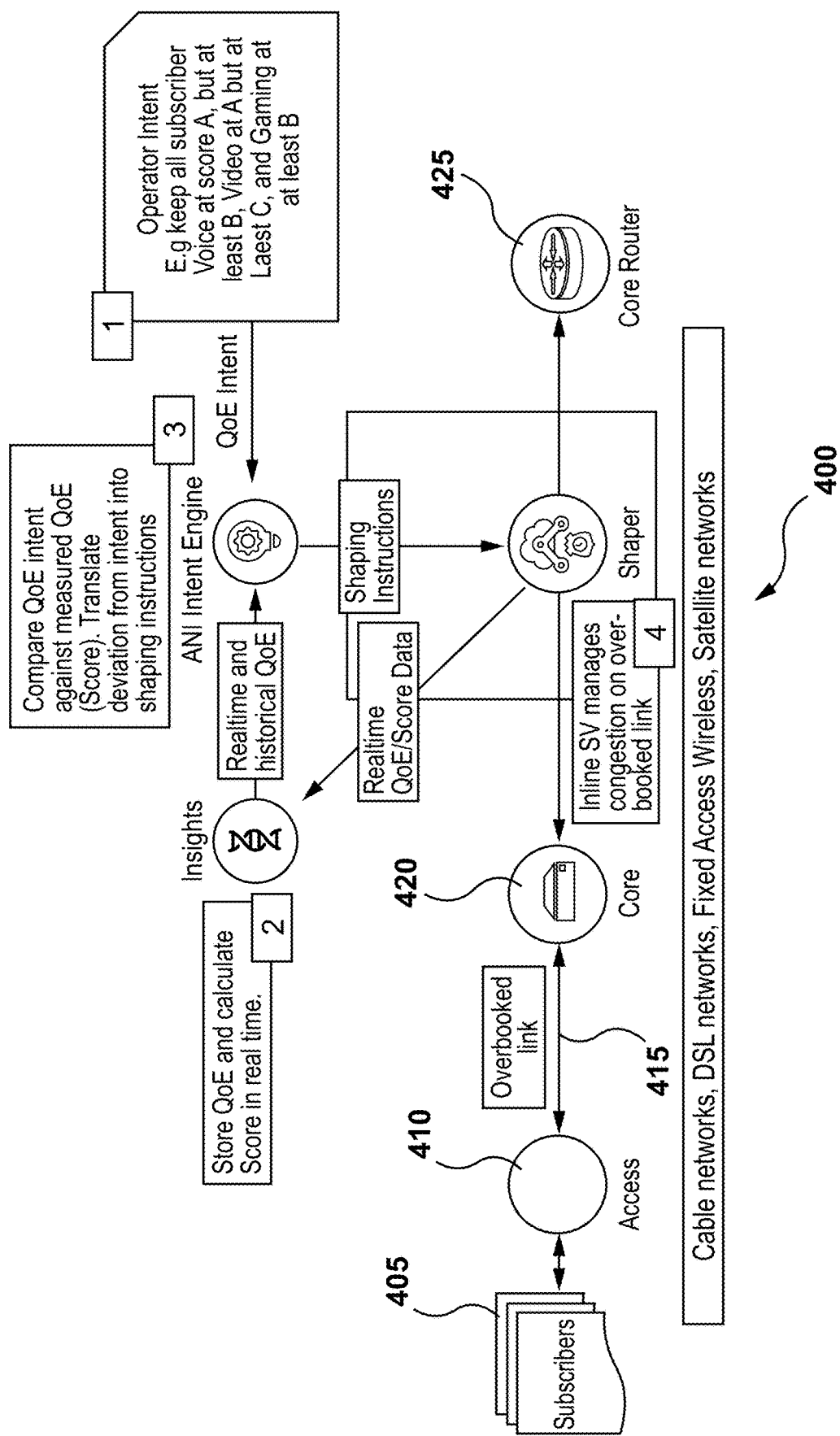
FIG. 6 illustrates a method of intent based traffic management with interactions with the computer network.

FIG. 6 illustrates a method of intent based traffic management with interactions with a computer network. Subscribers 405 access content via an access network 410. The access network 410 may access the core network 420 via a link 415. The link 415 may often becomes congested or overbooked. It will be noted that this scenario can occur in various networks, including for example, cable networks, DSL networks, Fixed Access Wireless networks, satellite networks or the like. The system 100 is intended to manage congestion on the overbooked link 415. The system is intended to be in line between the core network 420 and the core router 425. As noted herein, the operator may define an operator intent, for example, keep all subscriber Voice at score A or B, keep video at least at C, and gaming at least at a B score, or the like. It will be understood that operator intent can be defined at a per operator basis or at a different level of granularity. The QoE intent 430 is defined and saved by the system 100 in the memory component 125.

The system 100 determines the real time QoE and a score or predetermined value associated with the QoE metrics per application type. The analysis module will review the real time and historical QoE to determine any deviation from the operator intent or desired outcome. The analysis module 110 will determine at least one shaping action to be performed by at least one shaper 115, translating the deviation from into an appropriate shaping action. The shaper 115, located within the core network, will then shape the operator bandwidth to move the network closer to the operator's intent.

Figure 7:
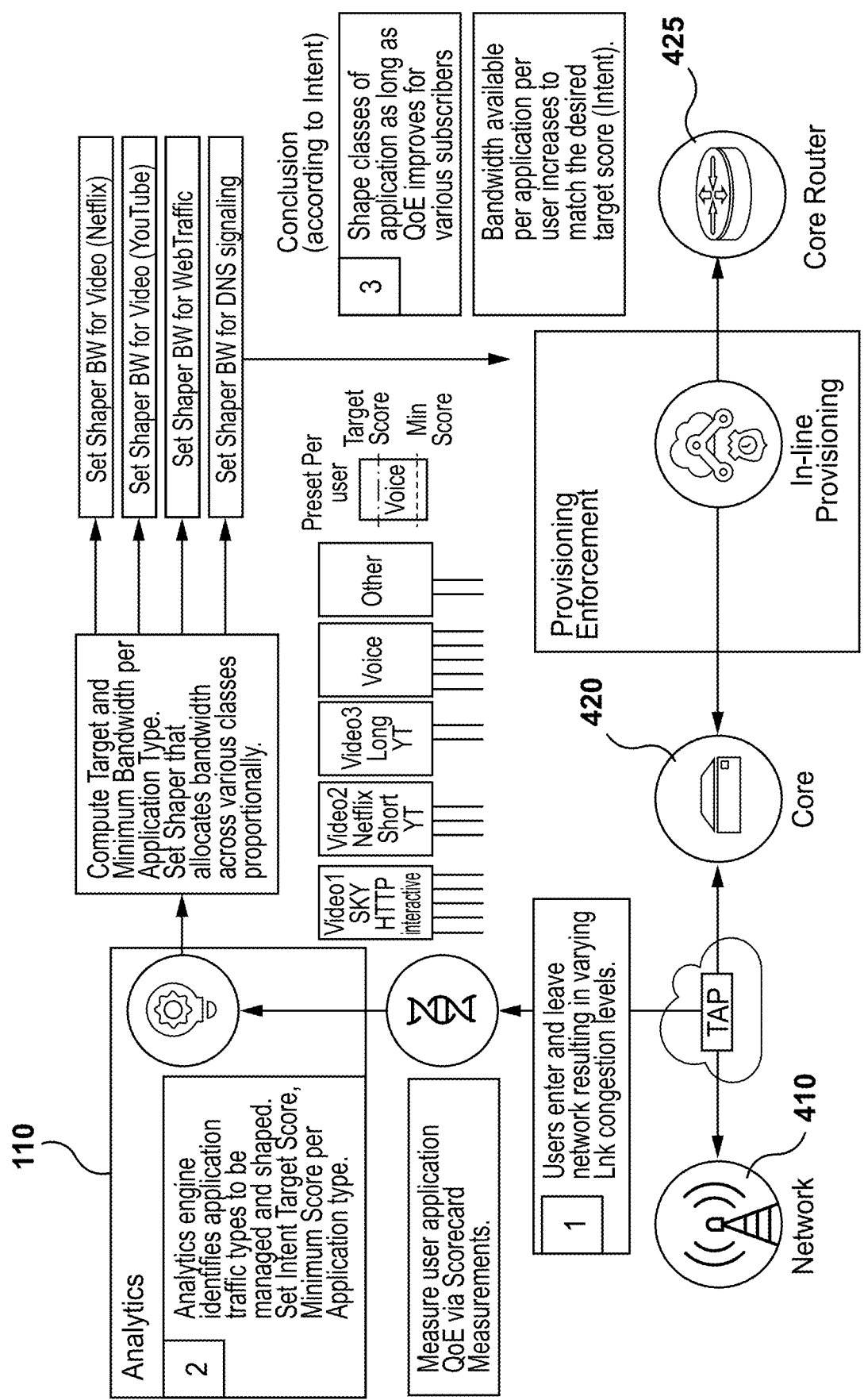
FIG. 7 illustrates a method of intent based traffic management to enable congestion management according to an embodiment.

FIG. 7 illustrates an embodiment showing a specific example of method of intent based traffic management to enable congestion management. In this example, as users enter and leave the network, various links may become more or less congested. Congest links often occur between an access 410 and core network 420 as well as in other locations. The analysis module 110 may include an analytics engine which identifies application traffic types to be managed and shaped. The analysis module may set an intent or desired target score and a minimum score per application type. The system also measures user application QoE to determine a current score for the QoE metrics per application. Having a score for the users allows the QoE metrics for different applications to be compared and reviewed with a single system.

The target and minimum bandwidth per application type is calculated and the at least one shaper 115 allocates bandwidth across various classes proportionally as shown in FIG. 7. In some cases, a separate shaper may be set for various video application, voice applications, web traffic, gaming as well as for DNS signaling. The system is configured to shape classes of applications as long as the QoE continues to improve for various subscribers. It is intended that the bandwidth available per application per user increases to match the desired target score, or desired network operator outcome.

It is intended that embodiments of the present system and method allocate bandwidth dynamically based on application specific QoE metrics. The system and method is intended to provide better per user application QoE while further providing fairness amongst all users in the class. The system is intended to dynamically adapt to application mix without manual intervention. The system and method can provide for continuous fine-tuning of traffic shaping with no additional thresholds and no WFQ settings.

At least some of the embodiments of the system and method detailed herein are intended to deliver application specific QoE based on application specific Key Performance Indicators (KPIs). Some applications have defined KPIs while others may not. Voice may be evaluated based on Mean Opinion Score (MOS), Video QoE may be evaluated by buffer stalls, number of quality shifts or the like. Web traffic may be evaluated by download time, or a similar KPI. All applications, irrespective of their individual QoE metrics are calibrated through a scoring system, wherein the score of an application indicates the QoE for a given application that users would experience on the like. Often Voice may be assigned a high target score to reflect the requirement of high QoE for voice users. Operated sourced video may be given a higher core compared to Over The Top (OTT) video. Web traffic may be given a lower score compared to other classes. The system and method may further manage congestion in the links recognizing that each application has unique Application Specific QoE KPIs.

In some cases, a transformation table defined for QoE score is a representative way for measuring the QoE for each application type. A transformation table is intended to take metrics, for example, loss, throughput, RTT or the like, and cover the metrics to a per application score based on the quality of experience metrics for that specific application. In some cases the score may be on a scale of 0 to 5, although other scales may be used. The score for a given application is a weighted function of the QoE metrics. The weight may vary from application to application depending on the sensitivity of the QoE in relation to the metric. For example, to get a high score for voice, a higher weight could be given to delay compared to throughput as voice is more sensitive to delay. The weights may be predetermined based on review of the QoE metrics and may be updated when new applications or metrics are added.

At least some of the embodiments of the system and method are intended to permit flexibility in configuring application specific tests, for example, a Netflix™ speed test. The system and method are further intended to remove additional thresholds as, other than a specific DNS or required traffic minimum, no other thresholds may be required.

Figure 8:
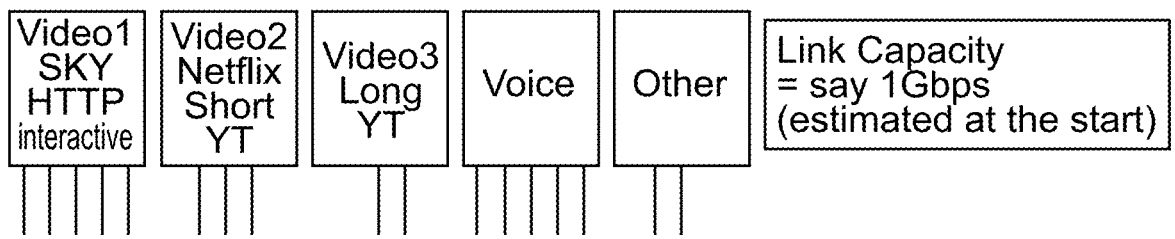
FIG. 8 illustrates a link capacity division according to an embodiment.

All applications may be mapped to one of the application types that may be defined by the system, an example mapping is shown in FIG. 8. Application with similar expectations of user QoE as measured through a common score, may be grouped in the same class. Shaping treatment given to a class is expected to affect the user perception of QoE of all of the application within a class to a similar extend as the applications are of a similar type. If there is an application that is not mapped, the allocation module may map it to new application type and may define how to measure its quality. For DNS traffic, the system is intended to allocate a minimum bandwidth (BW).

The at least one shapers 115 is intended to shape traffic per class (per application type). Per user shapers may split the bandwidth evenly among all subscribers in that category. In some cases, there may additional modules that may allow for a split of the bandwidth within a class, which may allow for the bandwidth to be distributed unevenly amongst various subscribers. In some cases, it may be desirable to grant some subscribers more resources compared to some of the other subscribers in the same class. In some cases, this may be implemented through a weighted round robin mechanism or through various other methods. For example, instead of distributing the bandwidth in the Content Download class equally amongst all users, it may be weighted in favor of enterprise users. Enterprise users may be allocated a higher percentage of the bandwidth allocated compared to residential users. On the other hand, bandwidth for gaming may be preferentially weighted and allocated more towards residential users compared to enterprise users.

Figure 9:
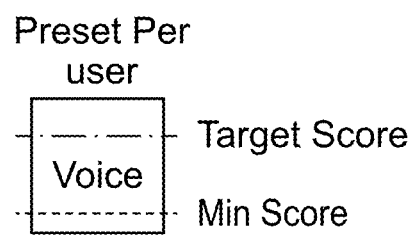
FIG. 9 illustrates an example of target score and minimum score for an application class.

Each application type (application) will have target QoE score that the network operator hopes to maintain for all subscribers who use this application type (application). Each application type (application) will also have minimum QoE score that is intended to define a lowest level of QoE to be maintain for all subscribers who use this application type (application). The target QoE for a specific category is greater than or equal to minimum QoE for that category. FIG. 9 illustrates an example of a target and minimum score for an application type, in this example, the Voice application is illustrated.

All applications types (applications) are intended to be given the same priority for achieving their target QoE. All applications types (applications) may have the varying priority for achieving their minimum QoE. This may be invoked when there is insufficient link capacity needed to meet the minimum bandwidth requirements for all the classes. In some specific cases, if the minimum is not able to be met, the operator may be alerted by the system as additional capacity planning may be required.

Referring back to FIG. 8, it is intended that each class has only one application type (Video) with multiple applications (for example, YouTube™, Netflix™ streaming services). Each class is evaluated based on its application specific QoE metric, as detailed herein.

Bandwidth may be allocated by the at least one shaper 115 to each class based on demand. Demand is proportional to the required QoE for users in that class. As the number of users entering and leaving each class changes dynamically, demand also changes. Thus the bandwidth required per class (per application type) changes dynamically as Demand=number of users*desired target score. As such, the system and method may allocate bandwidth to the class based on current demand.

Further, embodiments of the system is intended to ensure that minimum bandwidth for each class is granted, including a minimum bandwidth for an "Other Class" which may include the DNS signaling. As noted herein, the at least one shaper 115 is intended to shape traffic per class, for example, per application type.

It will be understood that within each class there are multiple users. The method detailed herein is intended to promote fairness amongst users by allocating bandwidth equally amongst all users.

Each class may have one shaper 115. Thus, each shaper may shape one application type, and may be set independent of other shapers. Further, each class is assigned a target score. In some cases, the initial configuration may be set by an operator. In other cases, the system may be pre-configured with a target score. Each class may also be assigned a minimum score. In some cases, an initial configuration may be set by the operator or may be pre-configured by the system. It is intended that Target Score>=Minimum Score.

The allocation module allocates Bandwidth (BW) to meet Target Score and/or Minimum Score for each class to initialize the system. The Target Score may not change over time. In some cases, the Target Score may be updated if further resources are provided to the network or if the operator so chooses for various reasons. The Target bandwidth may vary depending on the number of users in that class. Similarly, the Minimum Score is not intended to change over time, while the Minimum Bandwidth may be adjusted based on the number of users per class. Within each class, each user aims to achieve a certain desired (preset) target score—Ti. It will be understood that this desired target score Ti is not applicable in the "Other" class where the traffic is provided a specific bandwidth.

The system presets a target and minimum score as described above. The system then determines current scoring as detailed herein. On a predetermined interval, for example, every 2 minutes, every 5 minutes, every 10 minutes or the like, the system may measure a per user score and a per user bandwidth. The system may then compute Target Bandwidth and Minimum Bandwidth as follows:

i. Target Bandwidth (Target BW)∞Target Score* # users in the class
 ii. Minimum Bandwidth (Min BW)∞Minimum Score*# users in the class The system may ensure that minimum bandwidth for each class is granted including the minimum bandwidth for the 'Other' Class.

After the target and minimum bandwidth are computed, the allocation module may allocate the required Minimum BW to the "Other" class first. After this allocation, further computation may be used to determine further bandwidth allocation. In each iteration, set the Shaper Bandwidth=f (computed Target BW, computed Min BW).

The system and method may encounter, for example, 3 scenarios that account for varying volumes of traffic, which can be interpreted as, too many users, too few users, and a congested link. In this example, a 1 Gbps is used to illustrate the scenarios. It will be understood that other capacities would be similarly treated by the system.

Scenario 1 may be reviewed as too many users or a significant number of users enter the network. In this case: ΣMinimum Bandwidth>Link Capacity, which would imply that ΣMin BW>1 Gbps.

In this cases, there are too many users in the network to properly allocated bandwidth. In this case, the system may allocate Minimum BW to each Class based on predefined priorities. In some cases, the predefined priorities may include, giving highest priority to DNS signaling, giving voice higher priority than video applications, giving lower priority to web traffic and gaming, or the like. Some classes may not be allocated the minimum BW. If there is no constraint on Min BW then proportionally allocate BW amongst all classes. In some cases, if this scenario arises, the system may notify the operator that further resource planning may be required.

Scenario 2 may occur if users suddenly leave the network. This may be considered as having very few users in the network, for example: ΣMin BW<1 Gbps ΣTarget BW<1 Gbps. In this scenario, the system may begin by allocating minimum BW to each class as there is sufficient bandwidth to satisfy minimum bandwidth for all classes. The system may then determine that there is sufficient bandwidth to meet the total Target BW required. The system may then allocate the target BW and then proportionally allocate the amount above the target across the various classes.

Scenario 3 may be the most common scenario and can be considered as a congested link. In this scenario, large number of users are making use of the network so that ΣMin BW<1 Gbps, and ΣTarget BW>1 Gbps.

The system may allocate the minimum BW to each class. As there is sufficient bandwidth to satisfy the minimums for all classes the system does not need to prioritize any class. However, there is not enough to satisfy the total Target BW required. The system may allocate the minimum and then proportionally allocate the amount above the minimum across the various classes.

The proposed system may only require prioritizing when there are so many users in the network that the link capacity is not sufficient. In that case alone, the system may distribute the bandwidth across the classes based on priorities as the minimum for certain classes are not able be met.

The system and method disclosed herein aim to ensure optimal per user application QoE while ensuring fairness amongst users. Further detail is provided with respect to determining the allocation of the bandwidth per class.

Figure 10:
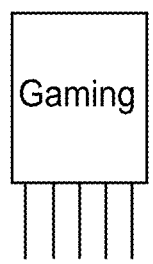
FIG. 10 illustrates an example of a division for a gaming class according to an example.

The system determines the Target BW per Class=f(Target Score, Measured Score). In a specific example, a gaming class may be considered. As shown in FIG. 10, the gaming class may have 5 users. It will be understood that in a large network, each class may have a plurality of users, and it may be significantly higher than 5.

Figure 12:
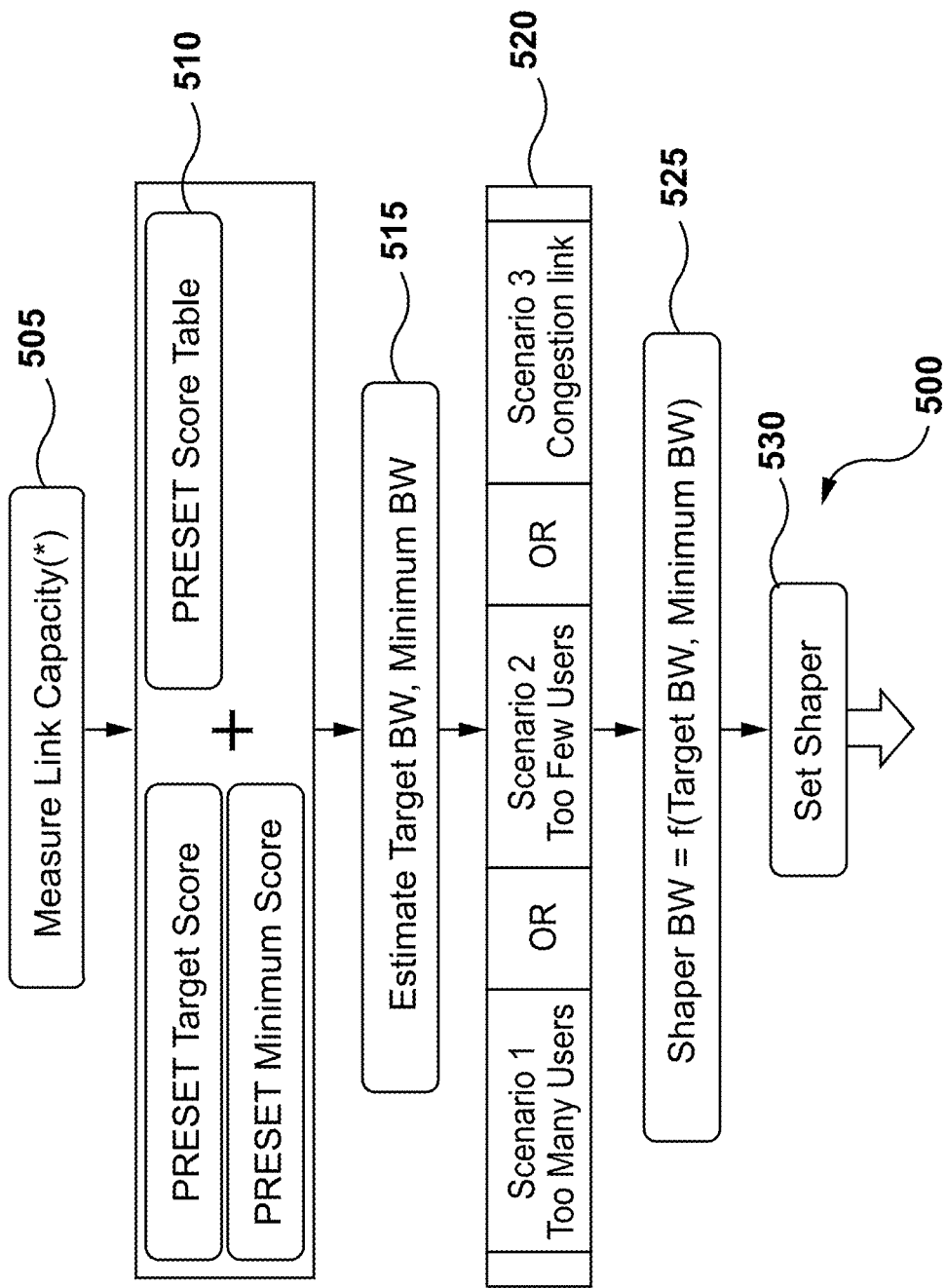
FIG. 12 is a flow chart illustrating a method for initialization of target and minimum bandwidth.

FIG. 12 illustrates a method 500 for initializing the system for intent based traffic management according to an embodiment. The system may measure the link capacity or may estimate the link capacity based on predetermined knowledge, at 505. The system computes the target bandwidth for that class based on the target rate that is indicated by a score derived from review of various QoE metrics, at 515. In one example, scores may be predetermined and stored in a table in the memory component, at 510. The table may, for example, have preset throughput values for each application type for different scores. Many different mechanisms may be used to determine application QoE. Alternative techniques may be used to measure application QoE. Other methods to characterize the application QoE may be used.

In some cases, Target Bandwidth=Target Rate (from the Predetermined Table)*# of users (say 5 in our gaming example).

The system may determine the target rate. First, a preset Target Score is determined. In this case, for gaming the score may be a Preset Target Score=C. Each Preset Target Score may corresponds to Target Score=3 in a predetermined Table as shown below.

A: 5
B: 4
C: 3
D: 3
E: 1
F: 0

In the Table, there may be different applications (for example, video, gaming, social). For each there may be 6 levels. For each level, there may be preconfigured values for max throughput, min throughput, delay (ms) and loss (expressed as a % of overall traffic volume). It will be understood that other metrics may also be used.

The system may then look up the application type and look up a target score from the predetermined table. An example table is shown in FIG. 11.

In this example, for Gaming, with Score the throughput is set to 512000 kbps. Therefore, the desired target rate per user for Score C=512000 kbps.

The system may then determine the Target Bandwidth for Gaming class, which would be equal to the Desired target rate per user*# of users (5 in the example). This provides for the Target Bandwidth for Gaming—2.6 Gbps A similar procedure for calculating Minimum Bandwidth Based on Preset Minimum Score may also be completed by the system, at 515. It will be understood that although described after, it may be done before or in parallel of determining the preset target score. In some cases, the minimum score may be looked up in a table similar to the table shown in FIG. 11. In this example, Minimum Bandwidth for Gaming class=Desired minimum rate per user*# of users (=5). Once the table is initiated, the preset table may no longer be necessary.

The system may also measure the link capacity, at 505. This may be done initially or in conjunction with other initialization steps. The link capacity may be estimated at the initialization of the method and may then be used for the calculations thereafter. In some cases, the link capacity may be measured when RTT sharply increases. As queues may grow non-linearly with increasing load, which may result in RTT increases. RTT is measure by the subscribers' response to the SYN/ACK from the server. Benchmark is defined where a significant amount of bandwidth can transfer not just the minimum. The link capacity may not remain constant for various reasons. There may be a need to re-estimate the available link capacity periodically over longer time durations. In some cases, the link capacity may be determined on predetermined intervals, for example, hourly, daily, weekly, monthly or the like.

In initiating, the system may begin with an estimated target BW and Minimum BW. This may allow for the sharper to have an initial target BW and minimum BW in order to, set the at least one shaper, at 525 and start shaping the traffic, at 530. Over time, as the closed loop control system is exercised over multiple cycles, the measured bandwidths per class will strive to reach the target bandwidth. If the measured scores fail to reach the target scores over several iterations, then the target score may optionally be lowered down a notch (for example, from B to C for a given class). This reduction in the target score acknowledges that the link capacity may not be sufficient to support all the applications, even over relatively long durations. In parallel, the link capacity may also be estimated again.

Figure 13:
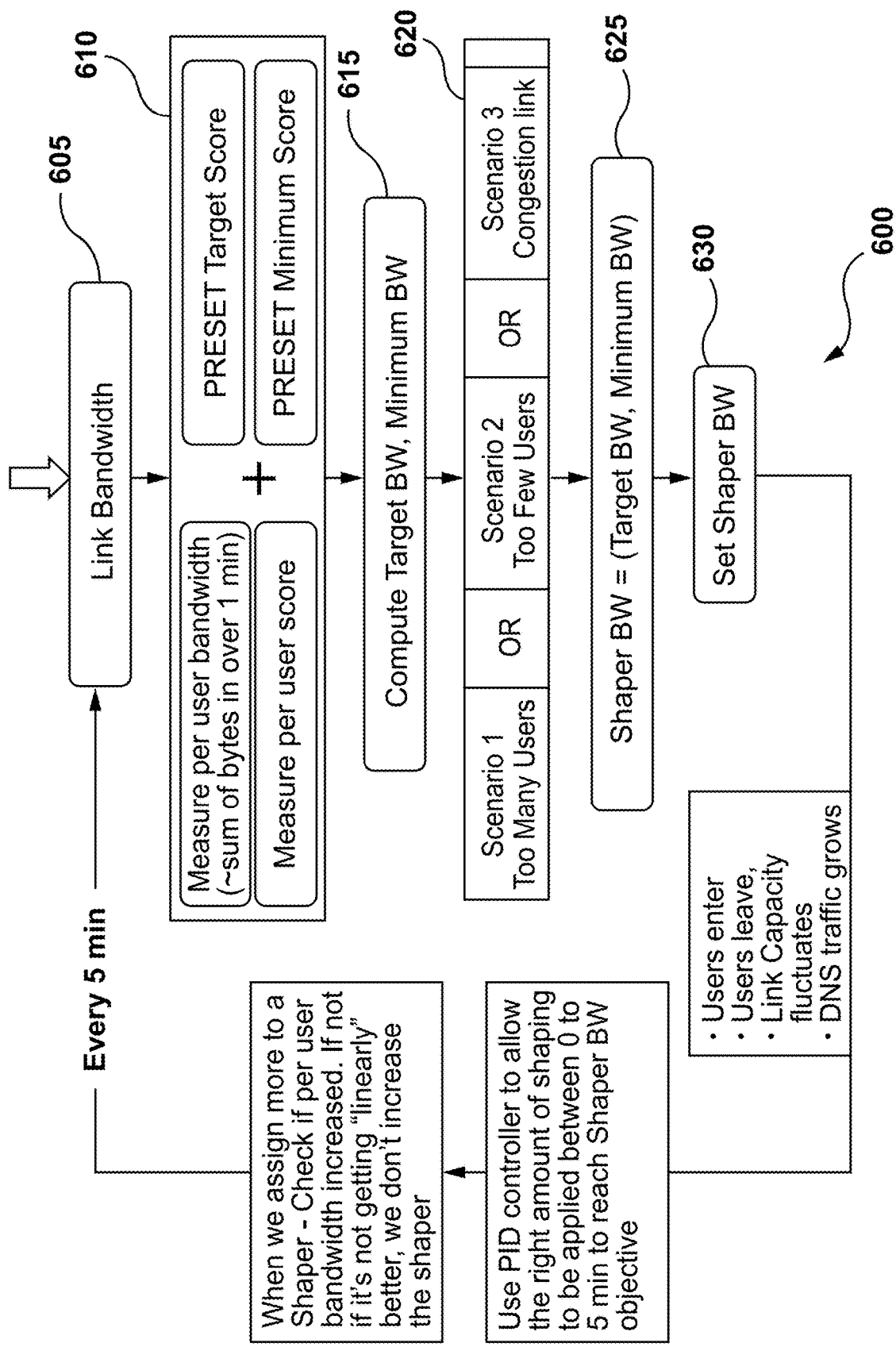
FIG. 13 is a flow chart illustrating a method for computation of target bandwidth and minimum bandwidth.

Once the system is initialized, a steady state operation of the method may occur. FIG. 13 illustrates a steady state operation of a method 600 for intent based traffic management according to an embodiment. The steady state may operate in a loop that occurs on predetermined time intervals, for example, every 5 minutes. The system reviews the link bandwidth, at 605. At 610, the system retrieves the number of users in each class, the target score and the minimum score from either the memory component, or from review of data stored in various networking devices which the system may be able to access.

The system may then measure each Application BW (bytes/min). In some cases, this variable is measured and reported as, for example, 30000 bytes in 5 minutes.

The system may then retrieve a measured per user score. In some cases, measured values of RTT, Throughput and Loss may be measured every 250 ms. The system may retrieve these values and/or a score from the user determined by these values. For every user in that Class (application type), review the score associated with the specific application category (eg Voice) to look up.

In some cases, the score may have the following QoE values RTT (say B), Throughput (say D), Loss (say A). It will be understood that other metrics may be used. In some cases, the measured user score=min (RTT score, Throughput score, Loss Score). In other cases, the average or mean score may be used. In this example, the measured user score=D=3

The system may also determine user scores for all other users in that class. It will be understood that users will experience different scores. The system may then average all user scores in that Class (application type). In this example, the average may be referred to as U_i.

At 615, the system may then compute Target BW, Min BW per Class (sometimes referred to as application type). The shaper, which may be an inline shaping entity may measure the application BW. Accordingly the system may compute the following:
   i. Target BW=# users*(Target Score*Measured BW/Measured average user score(U_i))
   ii. Minimum BW=# users*(Minimum Score*Measured BW/Measured average user score(U_i))

At 625, the shapers may then be set accordingly to shape or otherwise manage the traffic. In some cases, the shapers will be set as follows:
   i. Set Shaper BW=f(Target BW and Minimum BW)

The shapers may then shape the traffic, at 630. There may be three approaches possible, which may be used by the shapers. The shapers may provide for equal allocation of Bandwidth. Any excess bandwidth is equitably distributed amongst classes. Although this approach is simple and intuitive, it is class agnostic. As a result, some applications may get bandwidth they do not need.

Another option may be proportional allocation of Bandwidth. In this option, excess bandwidth is proportionally distributed amongst classes. The benefit is that this scheme allocates bandwidth across classes proportionally based on difference between Target and Minimum bandwidth. Proportional Allocation of BW accounts for various classes, as shown in scenarios at 620.

Another approach may be a hybrid approach, which may be a combination of equal allocation and proportional allocation. This may be exercised to fine tune the outcomes of the method described herein.

The system is then intended to determine whether the measured score is rising based on the applied shaping. In some cases, the subscriber or the content provider somehow may not get to the target score, and the reason may not be congestion on the link. In some cases, target score may be unreachable due to, for example, WiFi, device slowness, content server load, or the like. In this case, the system does not want to enter a loop where more and more bandwidth is assigned, but the score can not be improved. To counteract this problem the system may look at the score moving with each iteration, and if it's not getting "linearly" better, the shaping is not increased.

A specific example is shown below showing various scenarios with proportional allocation of Bandwidth In Scenario 1 with Too Many Users in the network so that the sum of the minimum bandwidths required for all the users exceeds 1 Gbps. The system will allocate minimums to each class, based on priorities and/or proportionality as shown in Table 1.

TABLE 1

| Proportional Allocation of Bandwidth - Too many users | | | | | | | |
|---|---|---|---|---|---|---|---|
| | | | DNS class | | | 1000 | Assumed Link Capacity |
| ~~Target~~ | 510 | 500 | 100 | 250 | 40 | 1400 | Computed Sum Target BW (not used) |
| Minimum | 250 | 490 | 90 | 210 | 40 | 1080 | Computed Sum Min BW |
| Priorities | 3 | 1 | 4 | 2 | 0 | | Priorities for assigning Min BW only |
| Allocation of BW = Shaper BW | 250 | 490 | 10 | 210 | 40 | 1000 | Assign Min BW based on strict priorities. Alternatively, we use a combination of strict priorities and proportional Min BW assignment. Assign MIN to DNS and the rest of the available BW is proportionally distributed. |
| | | | | | | 0 | Is the Sum of Min BW = Link Capacity? |
| | 0 | 0 | −80 | 0 | 0 | | Min BW Deficit for each Class |

In scenario 2, there are so few users in the system that the sum of the target bandwidths required for all the users is well below 1 Gbps. Allocate Target rate to each class and distribute the excess based on proportionality as shown in Table 2.

TABLE 2

Proportional Allocation of Bandwidth - Too few users

|  |  |  |  |  | DNS class | 1000 | Assumed Link Capacity |
|---|---|---|---|---|---|---|---|
| Target | 180 | 300 | 70 | 200 | 40 | 790 | Computed Sum Target BW |
| Minimum | 180 | 200 | 50 | 150 | 40 | 620 | Computed Sum Min BW |
|  | L-Sum(Min) | 380 | Sum(T) − Sum(Min) | 170 |  |  | Proportional Distribution |
| Allocation of BW = Shaper BW | 180 | 424 | 95 | 262 | 40 | 1000 | Is the Sum of Assigned BW = Link Capacity? |
|  | 0 | 124 | 25 | 62 | 0 |  | Excess Capacity Allocated above Target |

Scenario 3 may deal with a congested link, when there are users in the system that the sum of the target bandwidths required for all the users is above 1 Gbps, and yet all the minimum bandwidths for each of the classes is met. Allocate minimum rate to each and excess based on proportionality as shown in tables 3A and 3B TABLES 3a) and b)

Proportional Allocation of Bandwidth - Congestion

|  |  |  |  |  | DNS class | 1000 | Assumed Link Capacity |
|---|---|---|---|---|---|---|---|
| Target | 180 | 500 | 100 | 250 | 40 | 1070 | Computed Sum Target BW |
| Minimum | 180 | 450 | 90 | 200 | 40 | 960 | Computed Sum Min BW |
|  | L-Sum(Min) | 40 | Sum(T) − Sum(Min) | 110 |  |  | Proportional Distribution |
| Allocation of BW = Shaper BW | 180 | 468 | 94 | 218 | 40 | 1000 | Is the Sum of Assigned BW = Link Capacity? |
|  | 0 | 18 | 4 | 18 | 0 |  | Excess Capacity Allocated above Min |
|  |  |  |  |  | DNS class | 1000 | Assumed Link Capacity |
| Target | 300 | 500 | 100 | 250 | 40 | 1190 | Computed Sum Target BW |
| Minimum | 120 | 450 | 90 | 100 | 40 | 800 | Computed Sum Min BW |
|  | L-Sum(Min) | 200 | Sum(T) − Sum(Min) | 390 |  |  | Proportional Distribution |
| Allocation of BW = Shaper BW | 212 | 476 | 95 | 177 | 40 | 1000 | Is the Sum of Assigned BW = Link Capacity? |
|  | 92 | 26 | 5 | 77 | 0 |  | Excess Capacity Allocated above Min |

Figure 14A:
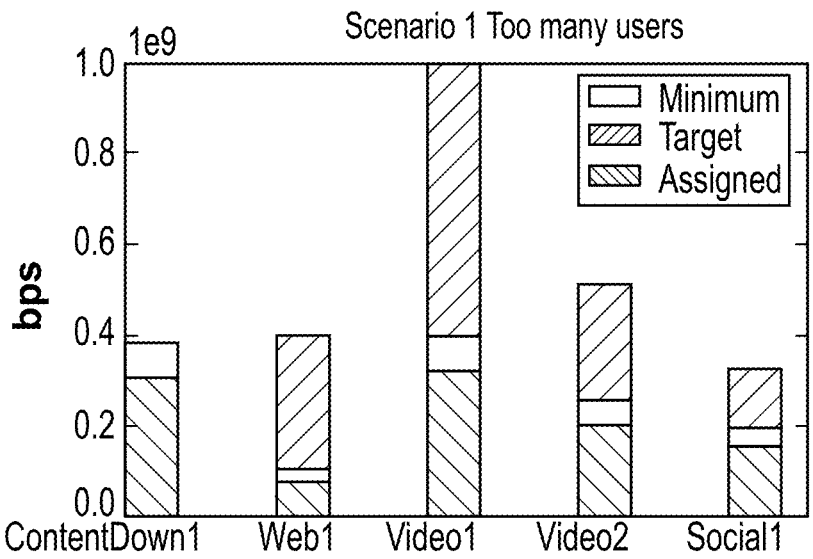
FIGS. 14A to 14C and 15A to 15C are graphs illustrating proportional bandwidth allocation in various scenarios.
Figure 14B:
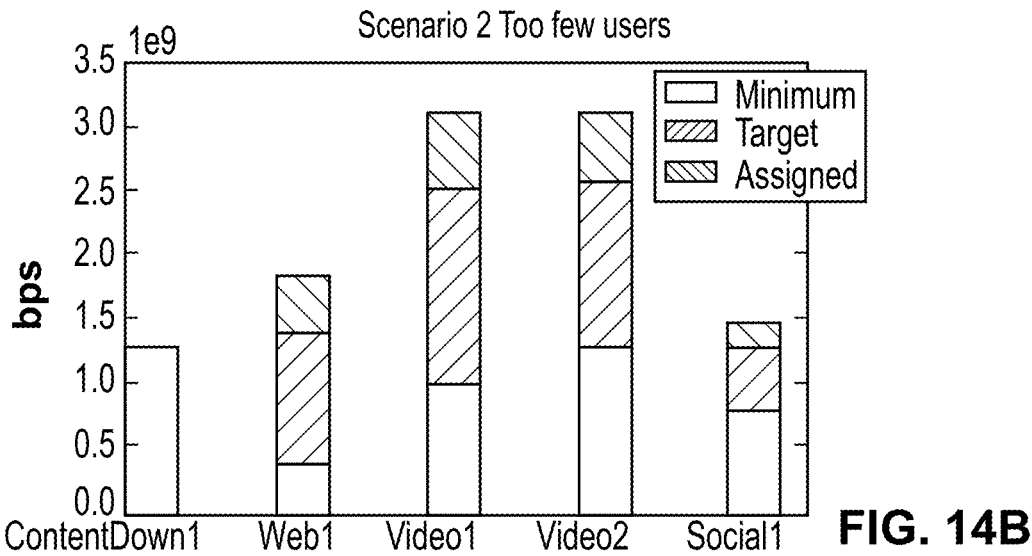
Figure 14C:
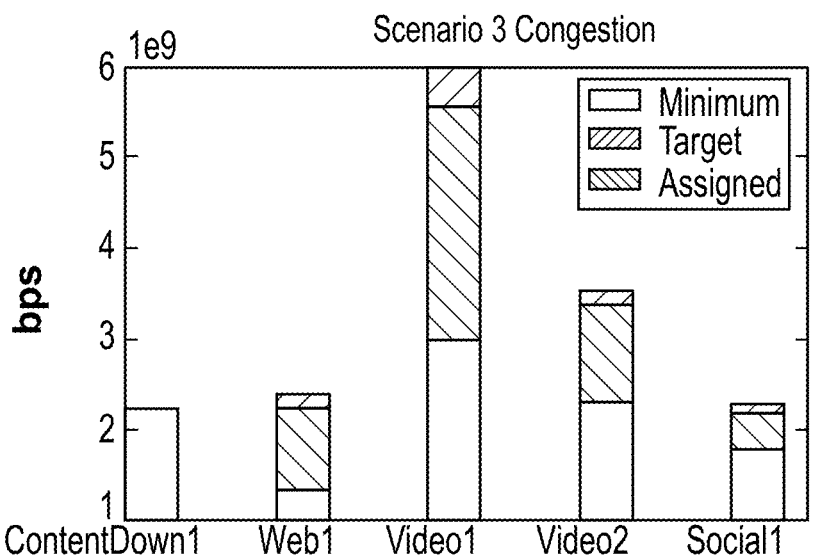

FIGS. 14A to 14C illustrate simulation results for various scenarios for Bandwidth allocation amongst various classes applying the method described herein.

An alternative approach to the proportional bandwidth allocation is the equal bandwidth allocation amongst all the users beyond the minimum bandwidth. The following illustrate a numerical example demonstrating the operation of the method for intent based traffic management.

Figure 15A:
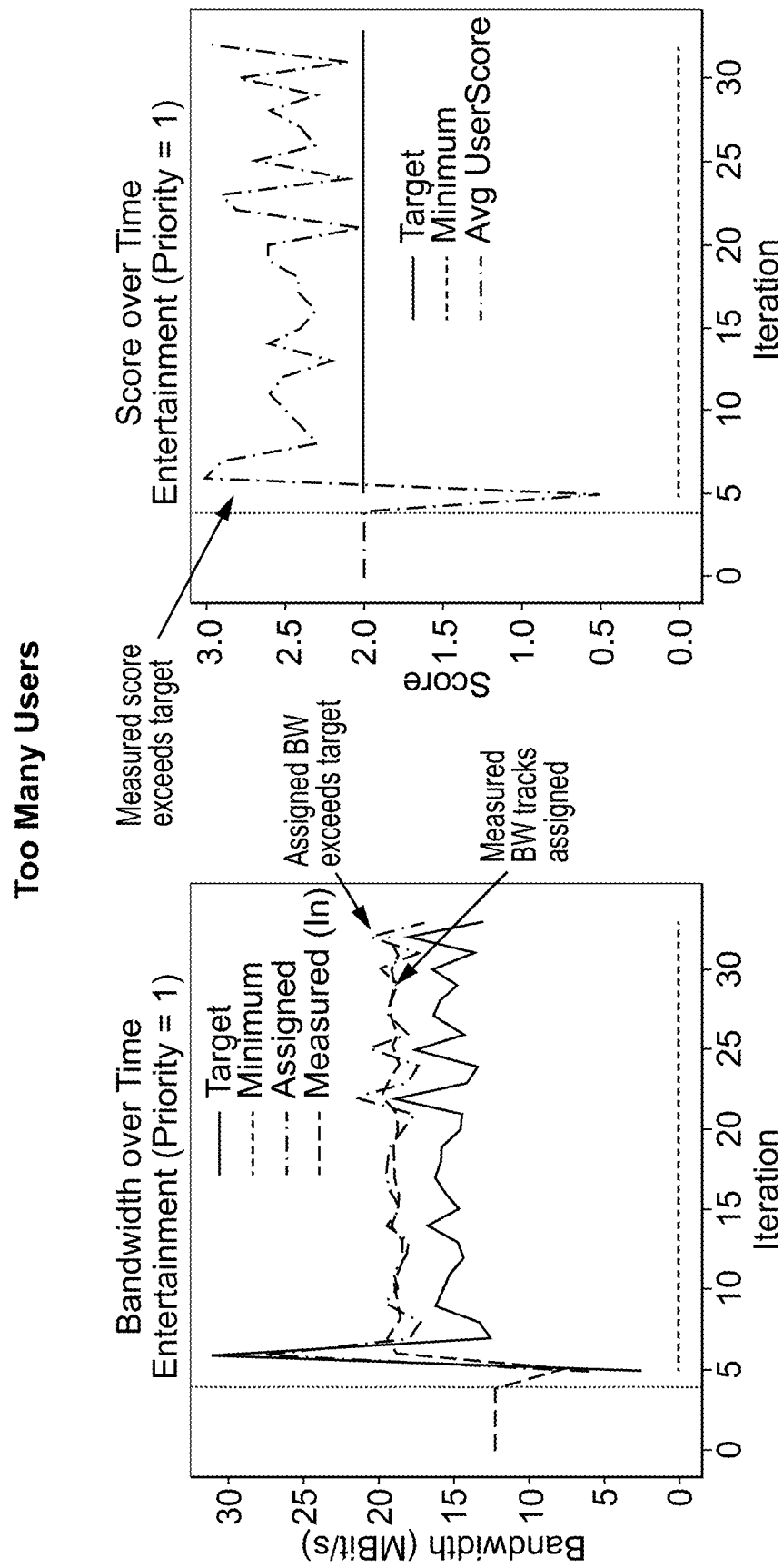

In Scenario 1 with Too Many Users the system will allocate minimums to each class, based on priorities and/or on equal allocation as shown in Table 4. FIG. 15A illustrates the scenario with graphs showing Bandwidth over Time and Score over Time. From the graphs it can be seen that the assigned bandwidth equals the minimum bandwidth as the lines overlap.

TABLE 4

Equal Allocation of Bandwidth - Too many users

|  |  |  |  |  | DNS class | 1000 | Assumed Link Capacity |
|---|---|---|---|---|---|---|---|
| ~~Target~~ | ~~510~~ | ~~500~~ | ~~100~~ | ~~250~~ | ~~40~~ | ~~1400~~ | Computed Sum Target BW (not used) |
| Minimum | 250 | 490 | 90 | 210 | 40 | 1080 | Computed Sum Min BW |
| Priorities | 3 | 1 | 4 | 2 | 0 |  | Priorities for assigning Min BW only |
| Allocation of BW = Shaper BW | 250 | 490 | 10 | 210 | 40 | 1000 | Assign Min BW based on strict priorities. Alternatively, we use a combination of strict priorities and proportional Min BW assignment. Assign MIN to DNS and the rest of the available BW is proportionally distributed. |
|  |  |  |  |  |  | 0 | Is the Sum of Min BW = Link Capacity? |
|  | 0 | 0 | −80 | 0 | 0 |  | Min BW Deficit for each Class |

Figure 15B:
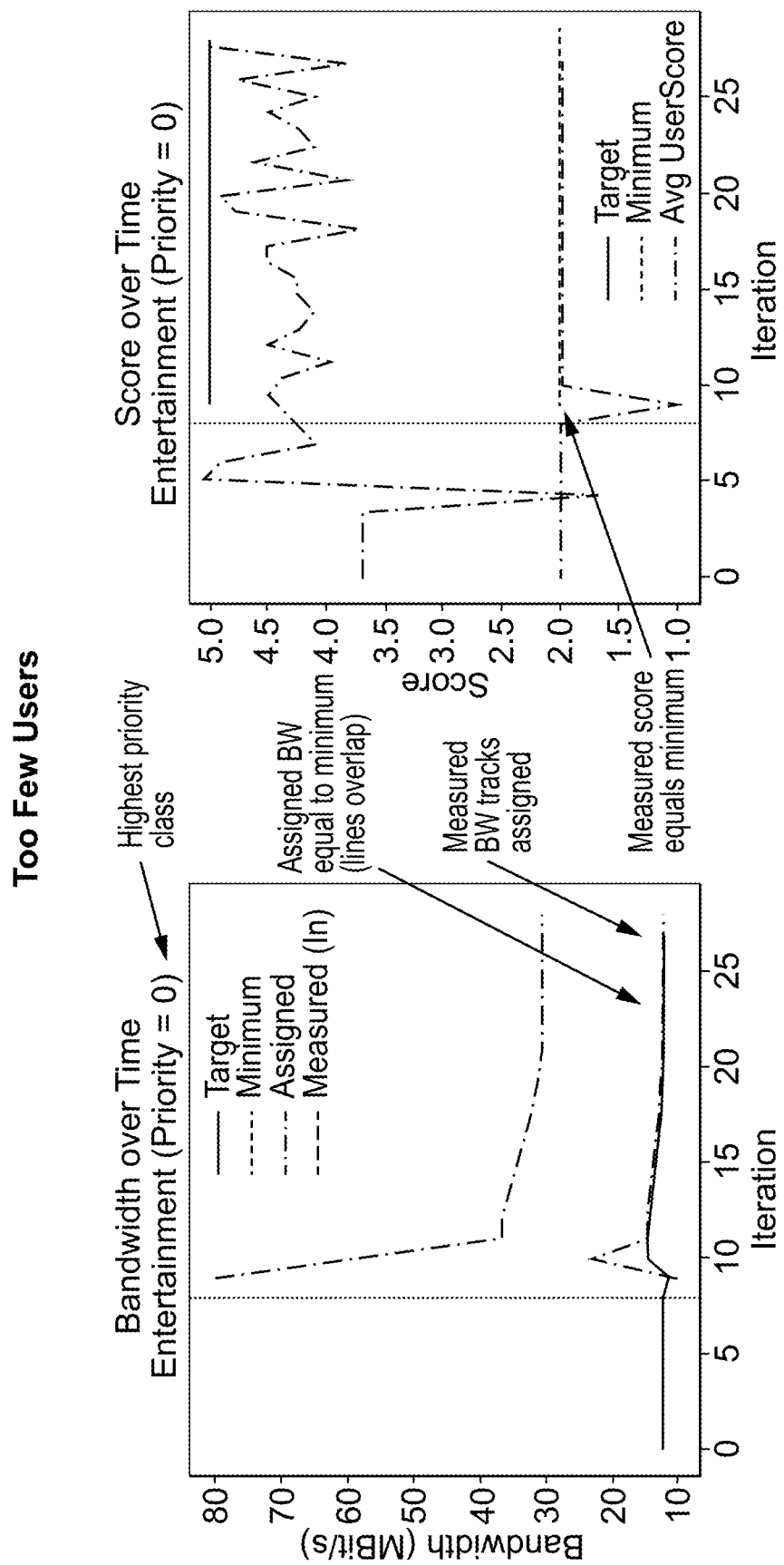

In Scenario 2 with Too Few Users the system is intended to allocate Target rate to each and divide the excess based on equal allocation as shown in Table 5. FIG. 15B illustrates scenario 2 and shows that the assigned bandwidth exceeds the target as well as the measured score exceeds the target over time.

TABLE 5

Equal Allocation of Bandwidth - Too few users

|  |  |  |  |  | DNS class | 1000 | Assumed Link Capacity |
|---|---|---|---|---|---|---|---|
| Target | 180 | 300 | 70 | 200 | 40 | 790 | Computed Sum Target BW |
| Minimum | 180 | 200 | 50 | 150 | 40 | 620 | Computed Sum Min BW |
|  | L-Sum(Target) | 210 | Allocation to each | 42 |  |  | Proportional Distribution |
| Allocation of BW = Shaper BW | 222 | 342 | 112 | 242 | 82 | 1000 | Is the Sum of Assigned BW = Link Capacity? |
|  | 42 | 42 | 42 | 42 | 42 |  | Excess Capacity Allocated above Target |

Figure 15C:
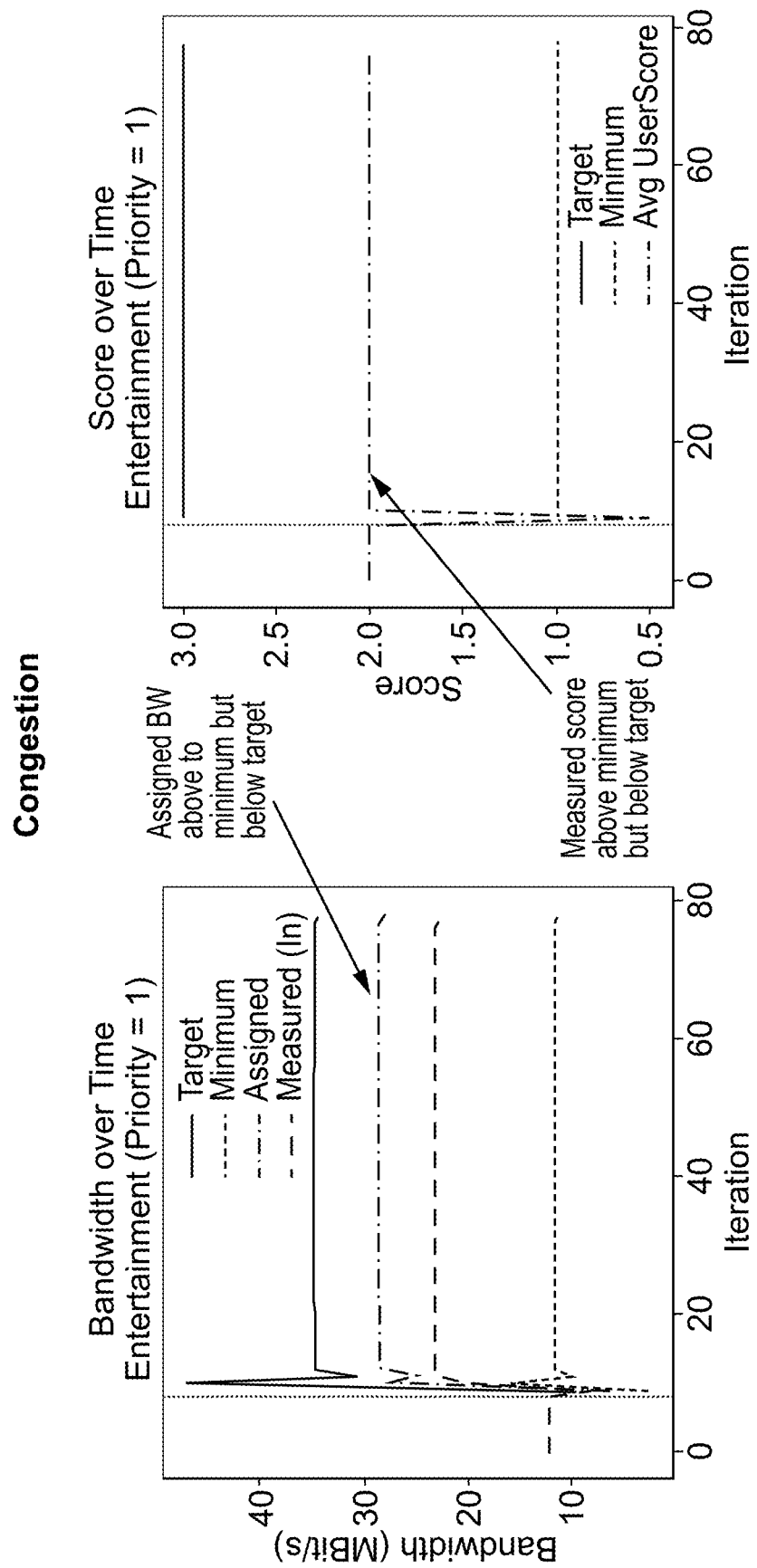

Scenario 3 where there is congestion, the system may allocate Minimum rate to each and excess based on equal allocation as shown in tables 6a and 6b. FIG. 15C illustrates scenario 3 where congestion can be found in the network. As it can be seen from these figures, the assigned bandwidth is between the minimum and target and the measured score is between the minimum and the target in this situation.

TABLES 6a) and b)

Equal Allocation of Bandwidth - Congestion

|  |  |  |  |  | DNS class | 1000 | Assumed Link Capacity |
|---|---|---|---|---|---|---|---|
| Target | 180 | 500 | 100 | 250 | 40 | 1070 | Computed Sum Target BW |
| Minimum | 180 | 450 | 90 | 200 | 40 | 960 | Computed Sum Min BW |
|  | L-Sum(Min) | 40 | Allocation to each | 8 |  |  | Proportional Distribution |
| Allocation of BW = Shaper BW | 188 | 458 | 98 | 208 | 48 | 1000 | Is the Sum of Assigned BW = Link Capacity? |
|  | 8 | 8 | 8 | 8 | 8 |  | Excess Capacity Allocated above Min |

TABLES 6a) and b)-continued

Equal Allocation of Bandwidth - Congestion

| | | | | | DNS class | 1000 | Assumed Link Capacity |
|---|---|---|---|---|---|---|---|
| Target | 300 | 500 | 100 | 250 | 40 | 1190 | Computed Sum Target BW |
| Minimum | 120 | 450 | 90 | 100 | 40 | 800 | Computed Sum Min BW |
| | L-Sum(Min) | 200 | Allocation to each | 40 | | | Proportional Distribution |
| Allocation of BW = Shaper BW | 160 | 490 | 130 | 140 | 80 | 1000 | Is the Sum of Assigned BW = Link Capacity? |
| | 40 | 40 | 40 | 40 | 40 | | Excess Capacity Allocated above Min |

The system and method is intended to optimize the link capacity dynamically to optimize per application QoE. The system accounts for the differences between QoE metrics for each application. The benefits of this solution may be that the system and method manage congestion in the links recognizing that each application has unique application specific QoE KPI. The method and system for Bandwidth Allocation accounts for application specific QoE (for example, Through-put, RTT, Loss, and the like).

The method and system described herein are intended to permit continuous fine-tuning of traffic shaping of varying application distributions with no thresholds and no WFQ settings. The method and system requires minimal manual configuration.

The method and system are further intended to ensure optimal operation irrespective of traffic mix with no need for any other pre-configuration, or any thresholds. Application specific requirements, for example, for Netflix™ streaming service, or other application, can be configured through appropriate setting of baselines as detailed below. The method and system are also intended to ensure per user fairness.

It will be noted that in the system, DNS traffic is always allowed, even in extreme congestion. DNS traffic is assigned the other class, and will be given a minimum BW that must be given to the class. This class may be the only case where the process of computing the minimum BW and Target BW is bypassed. For this class, the system may set a Minimum BW. The system will further set Target BW>=Min BW (in most classes, the Target BW will be close to Min BW). The system will then allocate Shaper BW=Target BW (for example, 10% of Link Capacity).

With respect to the Netflix™ speed test being always greater than some operator defined target score, the system may set the Min Score high in order to achieve the target. In some cases, the Minimum BW=# users * (Min Score *Measured BW/Measured average user score (U_i)). As the Minimums need to be met first the Minimum BW for Netflix™ speed test may always satisfied unless there are excessive users.

The system may also determine whether there is congestion on WiFi links. If there is congestion on WiFi links, then the 1 Gbps link capacity is not available. Every 5 min, measure link capacity (measured as the throughput when RTT increases sharply). In some cases, the link capacity will be lower than the estimated link capacity and the calculations may be modified accordingly.

In the preceding description, for purposes of explanation, numerous details are set forth in order to provide a thorough understanding of the embodiments. However, it will be apparent to one skilled in the art that these specific details may not be required. It will also be understood that aspects of each embodiment may be used with other embodiments even if not specifically described therein. Further, some embodiments may include aspects that are not required for their operation but may be preferred in certain applications. In other instances, well-known structures may be shown in block diagram form in order not to obscure the understanding. For example, specific details are not provided as to whether the embodiments described herein are implemented as a software routine, hardware circuit, firmware, or a combination thereof.

Embodiments of the disclosure or elements thereof can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with other modules and elements, including circuitry or the like, to perform the described tasks.

The above-described embodiments are intended to be examples only. Alterations, modifications and variations can be effected to the particular embodiments by those of skill in the art without departing from the scope, which is defined solely by the claim appended hereto.

What is claimed is:

1. A method for traffic management on a network, the method comprising:
    determining a desired outcome for a network operator's traffic;
    determining a set of classes for a traffic flow through a link;
    determining a minimum and target bandwidth for each class in the set of classes based on the desired outcome;
    measuring user score and bandwidth use for each class;
    allocating a bandwidth per class based on the minimum and target bandwidth and measured user score; and
    shaping the traffic flow to the allocated bandwidth.

2. A method according to claim 1 further comprising:
determining whether the shaped traffic is improving the measured user score;
if the shaped traffic is improving the measured user score, continuing to take further action;
otherwise reducing the shaping per class.

3. A method according to claim 1 further comprising:
estimating a link capacity;
determining whether the shaped traffic is able to meet a target score; and
if the target score is unreachable, amending the estimated link capacity and amending the target and minimum scores.

4. A method according to claim 1, wherein if the bandwidth to be allocated is less than the target bandwidth per class, the bandwidth over the minimum bandwidth per class may be allocated equally among classes.

5. A method according to claim 1, wherein if the bandwidth to be allocated is less than the target bandwidth per class, the bandwidth over the minimum bandwidth per class may be allocated proportionally among classes.

6. A method according to claim 1, wherein the set of classes is based on application type.

7. A method according to claim 1, wherein the measured user score is based on at least one quality of experience (QoE) metric.

8. A method according to claim 1, wherein the measured user score is based on a combination of round trip time, throughput and loss.

9. A method according to claim 1, wherein one class in the set of classes is dedicated to DNS signaling, and a minimum bandwidth for this class ensures the DNS signaling reaches its destination.

10. A method according to claim 1, wherein the measured user score is determined on a predetermined interval.

11. A method according to claim 10, wherein the predetermined interval is five minutes.

12. A system for traffic management on a network, the system comprising:
at least one processor connected to at least one memory storing instructions executable by the at least one processor to implement a plurality of modules comprising:
an allocation module configured to determine a desired outcome for a network operator's traffic, a set of classes for a traffic flow through a link; and a minimum and target bandwidth for each class in the set of classes based on the desired outcome;
an analysis module configured to measure user score and bandwidth use for each class and allocate a bandwidth per class based on the minimum and target bandwidth and measured user score; and
at least one shaper configured to shape the traffic flow to the allocated bandwidth.

13. A system according to claim 12, wherein if the analysis module determines the shaped traffic is improving the measured user score the at least one shaper may continue to take further action;
otherwise the at least one shaper reduces the shaping per class.

14. A system according to claim 12, wherein the set of classes is based on application type.

15. A system according to claim 12, wherein the measured user score is based on at least one QoE metric.

16. A system according to claim 12, wherein the measured user score is based on a combination of round trip time, throughput and loss.

17. A system according to claim 12, wherein one class in the set of classes is dedicated to DNS signaling, and a minimum bandwidth for this class ensures the DNS signaling reaches its destination.

18. A system according to claim 12 wherein, the analysis module is further configured to determine the measured user score on a predetermined interval.

* * * * *